S. REISER.
LOCKING DEVICE FOR MOTOR VEHICLES.
APPLICATION FILED APR. 8, 1918.

1,271,941.

Patented July 9, 1918.

Inventor:
Sigmund Reiser,
By Arthur H. Ewald
Attorney

UNITED STATES PATENT OFFICE.

SIGMUND REISER, OF CINCINNATI, OHIO.

LOCKING DEVICE FOR MOTOR-VEHICLES.

1,271,941.　　　　　Specification of Letters Patent.　　Patented July 9, 1918.

Application filed April 8, 1918. Serial No. 227,250.

*To all whom it may concern:*

Be it known that I, SIGMUND REISER, a citizen of the United States, and a resident of Cincinnati, in the county of Hamilton and State of Ohio, have invented certain new and useful Improvements in Locking Devices for Motor-Vehicles, of which the following is a full, clear, and exact description, reference being had to the accompanying drawings, forming a part of this specification.

My invention relates to locking devices for motor vehicles.

The principal object of my invention is to provide locking mechanism for locking the pedals and steering column of a motor vehicle. With this main object in view, the present invention is directed particularly to certain improvements in the locking plunger mechanism and other features of the lock set forth in my United States Patent No. 1,260,051 dated March 19, 1918. In the plunger mechanism of the locking device of my said patent, in order to engage the several locking mechanisms it is necessary to have both of the pedals of the vehicle and the steering column all in proper positions to receive the locking plungers simultaneously, which requires that both of the pedals be held in forward position at the same time and that the steering column be accurately set when the locking plungers are thrown. One of the objects of my invention is to obviate this difficulty by the provision of locking plungers which may be individually engaged automatically upon placing the pedals and steering column in the required position.

Other objects of my invention will appear from the following description thereof.

Figure 1:
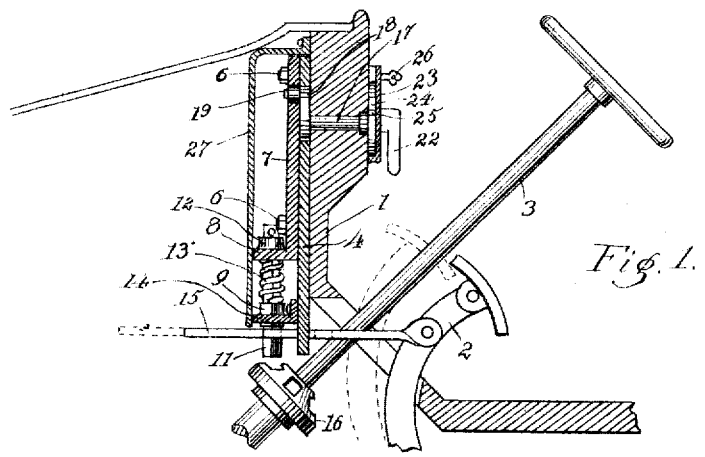
Figure 1 is a sectional view of a portion of a motor vehicle to which my new lock has been applied.

The numeral 1 indicates the dash of an automobile, 2 the pedal thereof, and 3 the steering column. Secured to the front of the dash 1, under the hood, is a base plate 4. Slidably mounted on the plate 4 by means of slots 5 and bolts 6 is a plunger plate 7, on the lower end of which is a forwardly extended flange 8. Mounted to reciprocate in openings in the flange 8 are three locking plungers 9, 10 and 11, which are arranged to lock the brake and clutch pedals and the steering column respectively. The said plungers are secured in the openings in the flange 8 by means of collars 12 above said flange, and coil springs 13 mounted on the plungers and interposed between the under side of the flange and shoulders on the respective plungers. Secured to the plate 4 is a guide plate 14, through which the lower ends of the plungers operate.

Pivotally connected with each of the pedals 2 is a lock bar 15, each of which is provided with an opening into which the lower end of the respective plunger may enter when the bar is in forward position, that is when the pedal is thrown forward, thus locking the pedal. The lock bars 15 slide through openings in the base plate 4. Mounted on the steering column is a collar 16 which has recesses in which the lower end of the third plunger 11, may enter, to lock the steering column.

Secured to the forward end of a shaft 17, rotatably mounted in the dash, is an eccentric disk 18, which is provided on its front face with a roller 19 which engages a slot 20 in the plunger plate 7. The disk 18 operates in an opening 21 in the base plate 4. The inner end of the shaft 17 has an operating lever 22. The shaft 17 is provided with locking mechanism in a housing 23 on the dash, which mechanism may be of any desired type, the features thereof comprising no phase of the present invention. It may consist typically of a disk 24 on the shaft 17, having notches 25 arranged to be engaged by a dog to be operated by a key 26 in the usual manner.

The plunger plate 7 and the plungers are covered by a housing 27 to prevent manipulation of the device.

Figure 2:
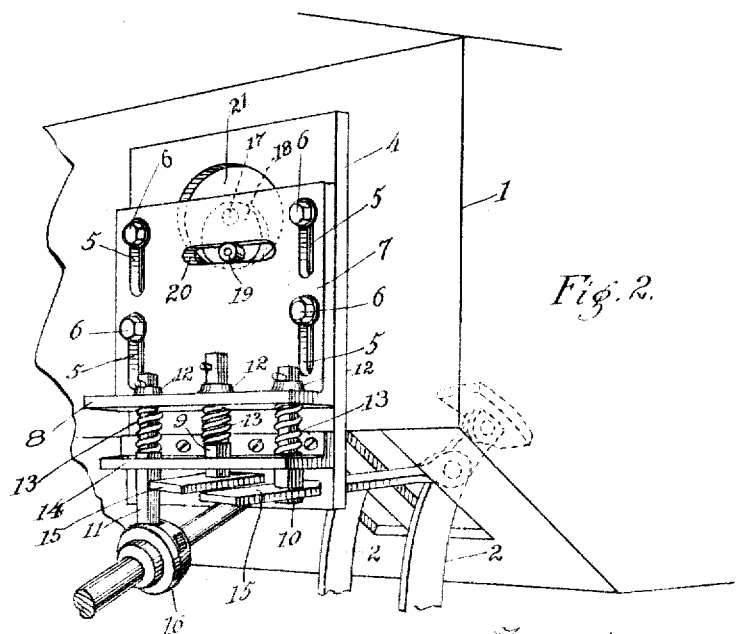
Fig. 2 is a perspective of the lock as attached to a vehicle.

The operation of the device is as follows: In order to lock the vehicle the lever 22 is first rotated so that the plunger plate 7 is pushed downwardly to its lowest position. In this position, the lower ends of the plungers abut against collar 16 and bars 15, the springs 13 being compressed, as shown in the case of the plunger 9 of Fig. 2. The pedals are then thrown forward, separately if desired, each of the plungers entering the opening in its lock bar as said opening comes under the plunger, being actuated by the springs 13; plunger 10 being shown in locked position. The steering column may be also operated and is similarly engaged by the plunger 11. The parts are secured in this position by means of the lock operated by the key 26. To unlock the vehicle, the key 26 is used to unlock the shaft 17, the plunger plate, and plungers, are then raised, thereby releasing the pedals and steering column.

Having thus described my invention, what I claim as new and desire to secure by Letters Patent, is:

1. In combination with a motor vehicle having pedals to control the operation of said vehicle, a plunger plate movably mounted on said vehicle, plungers movably mounted in said plate, bars connected with said pedals and operable therewith, said bars having openings arranged to be engaged by said plungers when the pedals and plunger plate are in prearranged locking positions, means on said plungers to place the same under tension against said bars when said plate is in locking position and said pedals are not in locking positions, whereby said plungers are caused automatically to enter the openings in said bars upon the operation of said pedals into locking positions, and means for the operation of said plunger plate.

2. In combination with a motor vehicle having pedals to control the operation of said vehicle, a plunger plate movably mounted on said vehicle, plungers movably mounted in said plate, bars connected with said pedals and operable therewith, said bars having openings arranged to be engaged by said plungers when the pedals and plunger plate are in prearranged locking positions, means on said plungers to place the same under tension against said bars when said plate is in locking position and said pedals are not in locking positions, whereby said plungers are caused automatically to enter the openings in said bars upon the operation of said pedals into locking positions, means for the operation of said plunger plate, and means to lock said plunger plate in locking position.

3. In combination with a motor vehicle having pedals and a steering column to control the operation of said vehicle, a plunger plate movably mounted on said vehicle, plungers movably mounted in said plunger plate, bars connected with said pedals and operable therewith, said bars having openings arranged to be engaged by certain of said plungers when the pedals and plunger plate are in prearranged locking positions, a collar rigidly secured to said steering column, said collar having a recess arranged to be engaged by one of said plungers when the plunger plate and steering column are in locking positions, means on said plungers to place the same under tension against said bars and said collar respectively when said plate is in locking position and said pedals and steering column are not in locking positions, whereby said plungers are caused automatically to enter the openings in said bars and the recess in said collar respectively upon the operation of said pedals and steering column into locking positions, means for the operation of said plunger plate, and means to lock said plunger plate in locking position.

SIGMUND REISER.